United States Patent [19]

Deucker et al.

[11] 4,009,180
[45] Feb. 22, 1977

[54] CONTINUOUS PROCESS FOR PREPARING COPPER PHTHALOCYANINE

[75] Inventors: Walter Deucker, Neuenhain, Taunus; Ernst Spietschka, Oberauroff, Taunus; Dieter Steidl, Sulzbach, Taunus, all of Germany

[73] Assignee: Hoechst Aktiengesellschaft, Frankfurt am Main, Germany

[22] Filed: Nov. 14, 1973

[21] Appl. No.: 415,633

[30] Foreign Application Priority Data

Nov. 16, 1972 Germany .......................... 2256170

[52] U.S. Cl. .......................................... 260/314.5
[51] Int. Cl.² ................................... C09B 47/04
[58] Field of Search ............................... 260/314.5

[56] References Cited

UNITED STATES PATENTS

| | | | |
|---|---|---|---|
| 2,153,300 | 4/1939 | Dahlen et al. | 260/314.5 |
| 2,276,175 | 3/1942 | Fleysher et al. | 260/314.5 |
| 2,276,598 | 3/1942 | Stocker et al. | 260/314.5 |
| 2,284,685 | 6/1942 | Detrick et al. | 260/314.5 |
| 2,382,441 | 8/1945 | Reynolds et al. | 260/314.5 |
| 2,402,167 | 6/1946 | Lang et al. | 260/314.5 |
| 2,556,726 | 6/1951 | Lane | 260/314.5 |
| 2,556,727 | 6/1951 | Lane et al. | 260/314.5 |
| 2,556,730 | 6/1951 | Graham | 260/314.5 |
| 2,645,643 | 7/1953 | Gottlieb | 260/314.5 |
| 2,723,980 | 11/1955 | Tarantino et al. | 260/314.5 |
| 3,267,116 | 8/1966 | Braun | 260/314.5 |
| 3,642,815 | 2/1972 | Spietschka et al. | 260/314.5 |

OTHER PUBLICATIONS

Ullmann's Encyklopadie der techn. Chemie, vol. 13, p. 705 (1962), KHD Industrieanlagen AG publications including (1) cover letter; (2) extracts from the 1956 publication: 100 Jahre Humboldt 1856–1956 (3) PALLA–Schwingmuhlen Referenzliste R2–170; and (4) PALLA vibration mills 2–170e.
Kirk–Othmer, Encyclopedia of Chemical Technology, vol. 18, pp. 347–348, 353–54 (1969).

*Primary Examiner*—John D. Randolph
*Attorney, Agent, or Firm*—Curtis, Morris & Safford

[57] ABSTRACT

A continuous process for preparing copper phthalocyanines by caking a mixture of phthalodinitrile, and a copper salt which comprises carrying out the reaction in a continuously working, heatable, tubular vibration mill, which contains iron or steel bars in the grinding room.

In comparison with the continuous processes hitherto known this process requires a considerably smaller amount of thermal energy from outside, since the amount of heat formed in the strongly exothermic condensation process is, to a considerable extent conducted away from the reaction zone, with the aid of heat-conducting grinding bars, and is used in order to heat up the freshly introduced starting product to room temperature.

4 Claims, No Drawings

CONTINUOUS PROCESS FOR PREPARING COPPER PHTHALOCYANINE

The present invention relates to a continuous process for preparing copper phthalocyanine.

It is known that copper phthalocyanine can be prepared by heating a mixture of phthalodinitrile and copper salts up to temperatures above 150° C. This process has hitherto been carried out by a continuous method: the mixture of the ground starting products has been heated in a continuous-type oven on a heated endless conveyer belt to effect the desired reaction. At the turning point of the belt the compactly baked reaction cake formed was knocked off from the belt with a hammer mill and discharged by means of a screw (Fiat 1313, III, 278; Thomas und Moser, Phthalocyanine Compounds). This method has to be carried out under a nitrogen atmosphere, since the crude dyestuff leaving the oven has a tendency to self-ignition since it has still a very high temperature. The complete removal of the product caked on the conveyer belt causes difficulties. Prior to the subsequent purification of the crude dyestuff the crumbling product has to be ground in an additional operation. The process requires a high expenditure of energy, since the conveyer belt in the first half of the tunnel has to be heated during the whole reaction time, and the substantial amount of heat set free by the exothermic process can be used only very incompletely to heat up the freshly introduced starting mixture.

Another continuous process known for preparing copper phthalocyanine starts from phthalic acid anhydride, urea and copper salts and is carried out in a heatable screw. In this process the reaction mixture is allowed to migrate through the screw only in a 6 to 12 mm layer, so that the necessary heat transfer and the mechanical transport of the solidified final product is ensured without interruption. (U.S. Pat. No. 2,964,532). Due to the small through-put, the high expenditure of energy and the expensive apparatus this process is not economical.

It has now been found that copper phthalocyanine can be prepared very advantageously by baking phthalodinitrile and copper salts at temperatures above 150° C in a continuous working method on an industrial scale, in a continuously working, heatable, tubular vibration mill which contains iron or steel bars as grinding elements.

To carry out the process a tubular vibration mill of the usual construction is used, the first half of which is well insulated and, into which the mixture of the starting components is introduced. The second half of the tube is not insulated. For heating or cooling which may be necessary during the reaction, a heating tube reversible, if desired, to cooling, is attached in the middle of the grinding tube. About ¾ of the volume of the tubular vibration mill is filled with iron or steel bars, the lengths of which correspond to the grinding tube and the discharge device.

The iron or steel bars in the mill act not only as grinding agents to prevent, due to their very good grinding power, the caking of the dyestuff formed, but also they serve as a good heat exchanger to conduct away the heat set free in the reaction zone and bring about the rapid heating of the mixture of starting products introduced into the heating zone. The good thermal conductivity of the bars ensures, on the one hand, an economizing of heating energy introduced from outside the system into the heating zone, and on the other hand, a relatively low temperature of the copper phthalocyanine when leaving the mill. The heating of the grinding tube and of the grinding bars contained therein, to 150°–350° C, required for starting the reaction can be effected by an electric jacket heating and/or an incorporated central heating tube and/or by injecting hot air or hot nitrogen at the beginning of the reaction.

It is known that the condensation to give the copper phthalocyanine starts as soon as the mixture of phthalodinitrile and copper salts has been heated to its melting point of 145°–150° C. For the positive development of the reaction it is advantageous to pre-heat the apparatus to a temperature of 200°–320° C before starting the reaction.

The starting material for the preparation of copper phthalocyanine is an intimately ground mixture of phthalodinitrile and copper salt in the molar ratio of 4:1. Of the copper salts available the copper-I-chloride is preferably used. Other copper compounds used in the known continuous and discontinuous processes for preparing copper phthalocyanine can also be used in the present process.

To the phthalodinitrile-copper salt mixture used as starting material may be added in known manner a 1 to 4 fold amount by weight of anhydrous sodium sulfate. Urea may be added, if desired, to the mixture of phthalodinitrile and copper salt with or without addition anhydrous sodium sulfate, in order to reduce the content of chlorine of the copper phthalocyanine formed.

The added sodium sulfate, urea, substituted phthalodinitriles or catalysts can be used in the same way as in the case of the known continuous and discontinuous caking processes.

Thus, according to the new method of operation, the known mixtures for producing chlorinated copper phthalocyanine (content about 50% of monochloro-copper phthalocyanine) and copper phthalocyanine practically free from chlorine (total content of chlorine 0.3%) can be reacted with success.

Before introducing dosewise the starting components into the vibration mill, which serves, as a reactor, they are mixed and optionally ground. Due to the additional mixing and grinding during the reaction in the vibration mill, the requirements for mixing and fine division of the starting products are, on the whole, lower in the case of the present method than in the baking processes hitherto known for preparing copper phthalocyanine.

The mixture of the starting products is introduced dosewise and continuously into the upper half of the tubular vibration mill pre-heated to the reaction temperature, by means of a screw, if desired, through a closure.

The dosage speed has to be chosen in such a way that the freshly introduced reaction mixture is heated to at least 150° during the dwelling time in the vibration mill and that it has, at this temperature, a dwelling time of some minutes in order to condense completely to the copper phthalocyanine.

The heating time required depends on the amount of the dosage and the control of temperature. Since with a higher through-put increased amounts of reaction heat are set free, which are used to heat up the starting mixture, the dosage speed must be chosen in such a way as to ensure that at an optimal time/space yield the temperature does not exceed 350° C and that the statistical dwelling time is adjusted in such a way that only minor portions of non-reacted product are finally discharged from the apparatus.

In the case of the vibration mill used in the Examples having a length of 1200 mm for the grinding tube and an internal diameter of 200 mm for the grinding tube, the dosage of the mixture of starting products can be varied between 5 kg and 50 kg/h.

In contradistinction to the processes usual hitherto, the new process for the continuous preparation of copper phthalocyanines has the following advantages. During condensation the copper phthalocyanine formed is finely ground so that a subsequent grinding process in a separate working step is not necessary. In comparison with the continuous processes hitherto known the new method requires a considerably smaller amount of thermal energy from outside, since the amount of heat formed in the strongly exothermic condensation process is, to a considerable extent, conducted away from the reaction zone, with the aid of heat conducting grinding bars, and is used in order to heat up the freshly introduced starting product to room temperature. Depending on the quality of the insulation of the apparatus, it is necessary only at rather long intervals, to introduce relatively small amounts of heat from outside the system into the heating zone of the mill. Continuously conducting away the heat from the reaction zone into the heating zone has another advantage. Since the copper phthalocyanine no longer leaves the apparatus in an overheated state, there is no risk of self-ignition when contacting the air, despite the fine division of the product obtained. Furthermore, the space/time yield is considerably higher than in a self-cleaning screw apparatus.

Additional advantages of the new process are the low costs for investment and maintenance of a vibration mill in comparison with self-cleaning screw or conveyer drying machines having a discharge device for a compactly caking and adhering solidified melting cake.

Quality and yield of the crude copper phthalocyanine obtained according to the new process are identical to that of the products obtained by the industrial caking processes hitherto used. The following Examples illustrate the invention.

EXAMPLE 1

Technical data of the vibration mill used: Length of the grinding tube 1,200 mm, internal diameter of the grinding tube 200 mm, frequency of vibration 1,000 t/min, vibration height 8 mm, length of the discharge 170 mm, length of the grinding bars 1,350 mm, diameter of the grinding bars 20 mm. ¾ of the volume of the grinding tube is filled with grinding bars. The mill had a good heat insulation in the first half. The heating of the mill with the grinding bars was effected with hot air of about 300° C, which was blown through the grinding tube, until the apparatus showed a temperature of 250° C.

100 kg of phthalodinitrile and 20 kg of copper-I-chloride were mixed and ground. With a through-put speed of 20 kg per hour the mixture was introduced with the aid of a dosage screw into the above-described vibration mill previously heated to an inernal temperature of 270° C. The crude copper phthalocyanine formed was discharged through the outlet of the mill in a finely ground form as an easily flowing powder. After leaving the grinding tube the temperature of the reaction product was about 80° C.

The crude dyestuff was purified without any further grinding in usual manner by boiling with water and dilute hydrochloric acid. Purification could also be effected by recrystallisation from concentrated sulfuric acid. The yield of pure copper phthalocyanine with a content of chlorine of about 2.9% was in the range of from 85 to 90% of the theory, as in the case of the known processes.

EXAMPLE 2

100 kg of phthalodinitrile and 20 kg of copper-I-chloride were ground and subsequently mixed well with 100 kg of anhydrous sodium sulfate. With a through-put speed of 20 kg per hour the powder mixture obtained was introduced by means of a dosage screw, into a vibration mill as described in Example 1, which had been pre-heated to 280° C. The crude copper phthalocyanine formed left the mill in a finely ground state as an easily flowing powder. The temperature of the reaction product when leaving the grinding tube was about 70° C. The yield of crude copper phthalocyanine corresponded to that of Example 1.

EXAMPLE 3

100 kg of phthalodinitrile, 20 kg of copper-I-chloride and 20 kg of urea were mixed and ground. With a through-put speed of 35 kg per hour the mixture was introduced, by means of a dosage screw, into a vibration mill, as described in Example 1, which had been previously heated to an internal temperature of 260° C. The crude copper phthalocyanine formed left the mill in a finely ground state as an easily flowing powder. The temperature of the reaction product was about 80° C when leaving the grinding tube. After recrystallizing the crude product a copper phthalocyanine having a content of chlorine below 0.3 % was obtained with a yield of 85% of the theory. This result corresponded with discontinuous caking tests carried out with the same starting mixture.

We claim:

1. A method of making copper phthalocyanine which comprises preparing an intimate mixture of phthalodinitrile and a copper salt, continually feeding said mixture to a tubular vibration mill containing heat-conductive metal bars, said vibration mill having a heating zone and reaction zone and said mixture being passed successively through said heating zone and said reaction zone, vibrating said mill to further mix and grind said mixture, causing said mixture to be heated to a temperature above 150° C. in said heating zone to cause the components of said mixture to react exothermically in said reaction zone to form copper phthalocyanine, causing said heat-conducting metal bars to conduct heat generated in said reaction zone to the mixture in said heating zone and removing copper phthalocyanine from said reaction zone of said vibration mill.

2. A method according to claim 1 wherein said vibration mill and grinding bars are heated to a temperature of 150° to 350° C. before feeding said mixture to said mill.

3. A method according to claim 1 wherein the phthalodinitrile and copper salt are fed to said mill in a molar ratio of 4:1.

4. A method according to claim 1 wherein the mixture of phthalodinitrile and copper salt is fed to said vibration mill in dosage units.

* * * * *